United States Patent [19]

Hester, Jr.

[11] 3,897,446

[45] July 29, 1975

[54] 6-PHENYLTHIAZOLO[3,2-A][1,4]BEN-ZODIAZEPIN-1-(2H)-ONES, AND PROCESSES

[75] Inventor: Jackson B. Hester, Jr., Galesburg, Mich.

[73] Assignee: The Upjohn Company, Kalamazoo, Mich.

[22] Filed: Sept. 4, 1973

[21] Appl. No.: 394,043

[52] U.S. Cl...... 260/306.7 R; 260/239 BD; 424/270
[51] Int. Cl............................................ C07d 99/10
[58] Field of Search ............................. 260/306.7 R

[56] References Cited
UNITED STATES PATENTS 3,334,113  8/1967  Hoolihan...................... 260/306.7 R
3,755,300  8/1973  Tachikawa et al........... 260/306.7 R

*Primary Examiner*—Richard J. Gallagher
*Attorney, Agent, or Firm*—Ward F. Nixon; John T. Reynolds

[57]  ABSTRACT

This invention relates to 6-phenylthiazolo[3,2-a][1,4]-benzodiazepin-1(2H)-ones, pharmacologically acceptable acid addition salts thereof, and processes for their production. All of the compounds of this invention and the pharmacologically acceptable acid addition salts thereof have sedative, hypnotic, tranquilizing, muscle relaxant and anticonvulsant activities. For example, they are useful for their calming effect for reducing anxiety and aggressive behavior.

11 Claims, No Drawings

6-PHENYLTHIAZOLO[3,2-A][1,4]BENZODIAZEPIN-1-(2H)-ONES, AND PROCESSES

BACKGROUND OF THE INVENTION

1. Field of the Invention

This invention relates to novel benzodiazepines, methods of preparing them and methods of using them. More particularly this invention concerns novel 6-phenylthiazolo[3,2-a]-[1,4]benzodiazepin-1(2H)-ones.

2. Description of the prior art

Benzodiazepines have been described previously, see for example, U.S. Pat. Nos. 3,422,091 and 3,717,653. U.S. Pat. No. 3,422,091 describes the necessary starting materials for the process of the present invention. Ring closures using acetic anhydride and triethylamine are disclosed by M. Ohta and C. Shin, Bull. Chem. Soc. Japan, 38, 704, (1965).

SUMMARY OF THE INVENTION

The novel 6-phenylthiazolo[3,2-a][1,4]benzodiazepin-1(2H)-ones of this invention are illustratively represented by the following generic formula:

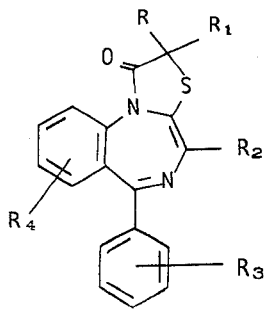

wherein R, $R_1$ and $R_2$ are each hydrogen or alkyl of 1 to 3 carbon atoms, inclusive, i.e., methyl, ethyl, propyl or isopropyl; and $R_3$ and $R_4$ are each hydrogen, alkyl, as defined above, halogen, i.e., fluoro, chloro or bromo, nitro, trifluoromethyl or alkylthio in which alkyl has the meaning given, above.

The compounds of formula I are prepared by (1) reacting a 1,3-dihydro-5-phenyl-2H-1,4-benzodiazepine-2-thione with 2-bromoacetic acid under basic conditions; (2) treating the [5-phenyl-3H-1,4-benzodiazepin-2-yl)thio]acetic acid thus obtained with acetic anhydride in the presence of triethylamine to obtain the corresponding 6-phenylthiazolo[3,2-a]-[1,4]-benzodiazepin-1(2H)-one of formula I, wherein R and $R_1$ are each hydrogen; (3) the 6-phenylthiazolo[3,2-a][1,4]-benzodiazepin-1(2H)-one thus obtained, is alkylated at the 2-position with an alkyl halide or sulfate to obtain a mixture of the corresponding compounds of formula I wherein R is hydrogen and $R_1$ is alkyl and the corresponding compounds of formula I, wherein R and $R_1$ are each the same alkyl radical; (4) the compounds of formula I wherein R is hydrogen and $R_1$ is alkyl are, if desired, again alkylated with an alkyl halide or alkyl sulfate to obtain the compounds of formula I wherein R and $R_1$ are each the same or different alkyl radicals.

The novel 6-phenylthiazolo[3,2-a][1,4]benzodiazepin-1(2H)-ones of formula I, above, exist in either the nonprotonated (free base) form or in the protonated (acid addition salt) form, depending on the pH of the environment. They form stable protonates, i.e., pharmacologically acceptable acid addition salts, on acidification of the free base with pharmacologically acceptable acids, for example, hydrochloric, hydrobromic, sulfuric, phosphoric, nitric, acetic, propionic, palmitic, benzoic, salicylic, hexynoic, phenylbutyric, naphthoic, glycolic, succinic, nicotinic, tartaric, maleic, malic, pamoic, methanesulfonic, cyclohexanesulfonic, citric, and lactic acids, and the like. Conversely, the free bases of the novel compounds of formula I can be obtained from a salt, (e.g, from the hydrochloride or sulfate salt) by neutralization with a base such as sodium hydroxide, extracting with an immiscible solvent, for example chloroform, drying the extract, for example with anhydrous sodium sulfate, and removing the solvent by evaporation.

All of the novel compounds of formula I and the pharmacologically acceptable acid addition salts thereof have sedative, hypnotic, anticonvulsant, tranquilizing and muscle relaxant effects in mammals and birds. They are useful for their calming effect in reducing anxiety and aggressive behavior.

Sedative effects of 8-chloro-6-phenylthiazolo[3,2-a]-[1,4]benzodiazepin-1(2H)-one are shown by the following tests in mice:

Chimney test: [Med. Exp. 4, 145 (1961)]: The effective intraperitoneal dosage for 50% of mice ($ED_{50}$) is 50 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 40 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is >200 mg./kg Nicotine antagonism test: Mice in a group of 6 are injected with the test compound (8-chloro-6-phenylthiazolo[3,2-a][1,4]benzodiazepin-1(2H)-one. Thirty minutes later the mice including control (untreated) mice are injected with nicotine salicylate (2 mg./kg.). The control mice show over stimulation, i.e., (1) running convulsions followed by (2) tonic extensor fits; followed by (3) death. An intraperitoneal dosage of 79.0 mg./kg. of the test compound protected 50% of the mice against (2) and 71.0 mg./kg. of the test compound protected 50% of the mice against (3).

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring, and flavoring agents may be added.

For mammals and birds, food premixes, with starch, oatmeal, dried fishmeat, fishmeal, flour and the like can be prepared. These are then incorporated into an animal feed.

As tranquilizers, the compounds of formula I can be used in dosages of 2–25 mg./kg. in oral, rectal, or injectable preparations as described above, to alleviate tension and anxiety in mammals, or birds, such as, e.g., occurs when animals are in travel.

DETAILED DESCRIPTION OF THE INVENTION

The novel compounds of this invention and processes for their production are illustratively represented by the following sequence of formulae:

wherein $R_2$, $R_3$ and $R_4$ have the meanings previously given; $R_5$ is an alkyl radical of 1 to 3 carbon atoms, inclusive, as hereinbefore defined and $R_6$ is an alkyl radical of 1 to 3 carbon atoms, inclusive, as hereinbefore defined.

The compounds of formulas Ia, Ib, Ic and Id are combined to form the compounds of generic formula I.

The process of this invention comprises the following steps:

1. The selected 1,3-dihydro-5-phenyl-2H-1,4-benzodiazepine-2-thione (II) is dissolved in a solution of an alkali metal hydroxide, e.g., sodium or potassium hydroxide, in a mixture of water and a lower alkanol, e.g., methanol, ethanol, propanol, isopropanol, butanol, tert. butanol and the like, and treated with 2-bromoacetic acid in solution in a dilute alkali metal hydroxide solution. The reaction is preferably carried out within a temperature range of from about 0°C. to about 30°C. for a period of from about 1 to 3 hours. The in-

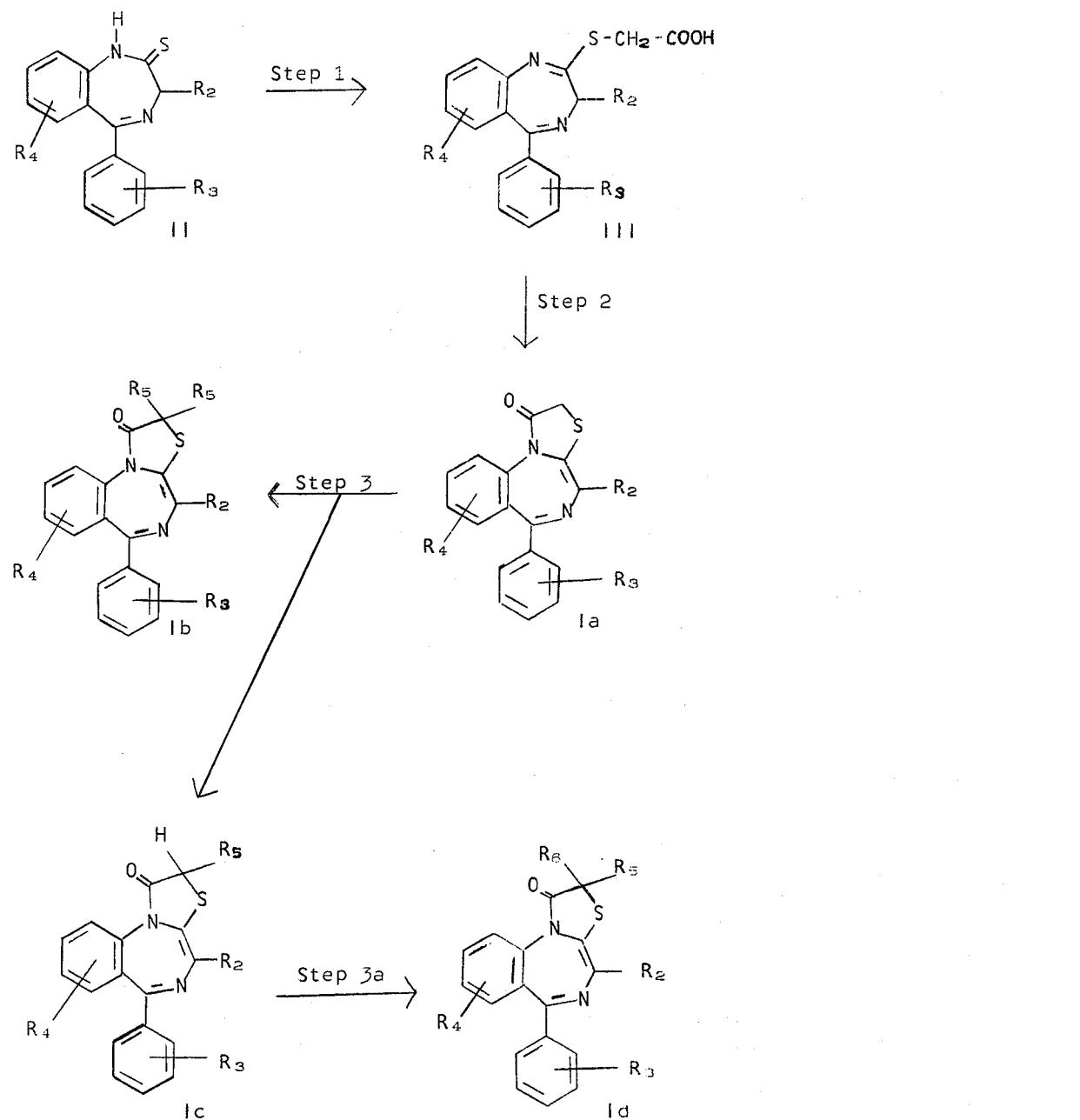

termediate [(5-phenyl-3H-1,4-benzodiazepin-2-yl)thio]acetic acid (III) thus obtained, is recovered from the reaction mixture by conventional methods, for example, the reaction mixture is cooled, acidified to about pH 3–4 with a mineral acid and the precipitate thus obtained is collected by filtration. The intermediate (III) thus obtained, can be further purified if desired by recrystallization from a suitable solvent, such as, an alkanol, e.g., methanol, ethanol, propanol, isopropanol and the like.

2. The intermediate [(5-phenyl-3H-1,4-benzodiazepin-2-yl)thio]acetic acids thus obtained are then subjected to ring closure with acetic anhydride in triethylamine to obtain the 6-phenylthiazolo[3,2-a][1,4]benzodiazepin-1(2H)-ones of formula Ia. The reaction is carried out within a broad temperature range, preferably from about 0°C. to about 80°C. for a period of from about 1 to about 5 hours. The products of formula Ia thus obtained are recovered from the reaction mixture and purified by conventional methods, for example, the reaction mixture is concentrated in vacuo and the residue thus obtained is crystallized from a suitable organic solvent such as an alkanol, e.g., methanol, ethanol, propanol, isopropanol and the like, ethyl acetate, methylene chloride, chloroform, hexanes, mixtures thereof and the like.

3. The products (Ia) obtained from step (2) are alkylated at the 2-position to give a mixture of the corresonding 2-alkyl-6-phenylthiazolo[3,2-a][1,4]benzodiazepin-1(2H)-ones and 2,2-dialkyl-6-phenylthiazolo[3,2-a][1,4]benzodiazepin-1(2H)-ones of formulas Ib and Ic, respectively. The reaction is carried out by forming the anion of the selected compound of formula Ia with a base such as lithium diisopropylamide or potassium t-butoxide, and the like, in a solvent such as tetrahydrofuran, dioxane, ether, dimethoxyethane and the like. The reaction is preferably carried out at a temperature within the range of from about −50°C. to about −100°C. for a period of from a few minutes to about 1 hour. The anion thus obtained is then treated with the appropriate alkyl halide or alkyl sulfate and allowed to warm to a temperature of about −20°C. to about 10°C. for a period of from about 15 minutes to 3 hours to obtain a mixture of compounds of formulas Ia and Ib which are recovered from the reaction mixture and purified by conventional methods. For example, the reaction mixture is poured into ice-water and the products are extracted with an immiscible organic solvent such as chloroform, methylene chloride, hexanes, benzene, toluene, cyclohexane, mixtures thereof and the like. The extract thus obtained is dried, concentrated and the residue thus obtained is chromatographed on silica gel and the products thus obtained are purified by crystallization from an appropriate organic solvent such as ethyl acetate, ethyl acetate-cyclohexane and others such as those named, above.

4. The 2-monoalkyl compounds of formula Ic can be alkylated in accordance with the procedure described in step (3) above to obtain the corresponding 2,2-dialkyl-6-phenylthiazolo[3,2-a][1,4]benzodiazepin-1(2H)-ones of formula Id, wherein $R_5$ and $R_6$ are the same or different alkyl groups. The product (Id) thus obtained is recovered from the reaction mixture by conventional methods, for example, by pouring the reaction mixture into ice-water and extraction with an appropriate solvent followed by crystallization as described in step (3), above.

The following examples are illustrative of the products and processes of the present invention but are not to be construed as limiting.

EXAMPLE 1

[(7-Chloro-5-phenyl-3H-1,4-benzodiazepin-2-yl)-thio]acetic acid (III)

A stirred solution of 34.9 ml. of 0.945 N aqueous sodium hydroxide solution and 45 ml. of methanol is cooled in an ice bath and treated successively with 8.6 g. (0.03 mole) of 7-chloro-1,3-dihydro-5-phenyl-2H-1,4-benzodiazepine-2-thione (II). To this mixture is added an ice-cold solution of 4.5 g. of bromoacetic acid in 34.9 ml. of 0.945 N aqueous sodium hydroxide solution and the resulting mixture is stirred at ambient temperature for about 40 minutes and filtered. The filtrate is cooled in an ice bath and acidified to pH 3.5–4.0 with dilute hydrochloric acid. The precipitate thus obtained is collected by filtration, washed with water and dried in vacuo. A solution of this material in ethanol is filtered through Celite. The filtrate is cooled with stirring in an ice bath, treated, dropwise with water until saturated, seeded with the product which is then allowed to crystallize. The solid is collected by filtration and dried to give 8.45 g. of [(7-chloro-5-phenyl-3H-1,4-benzodiazepin-2-yl)thio]acetic acid (III), m.p. 100°–106°. An analytical sample is recrystallized ethanolwater at 4°C. to give [(7-chloro-5-phenyl-3H-1,4-benzodiazepin-2-yl)thio]acetic acid (III), m.p. 107°–111°; UV (EtOH) end absorption, 212 $\mu$ (inflection, 26,000), 257 (inflection, 17,800), 283 (inflection, 10,200), 323 (inflection, 3550). The IR and NMR spectra support the proposed structure.

Anal. Calcd. for: $C_{17}H_{13}ClN_2O_2S$: C, 59.21; H, 3.80; Cl, 10.28; N, 8.13; S, 9.30.
Found: C, 59.06; H, 3.81; Cl, 10.20; N, 7.82; S, 7.15.

EXAMPLE 2

[(7-Chloro-3-methyl-5-phenyl-3H-1,4-benzodiazepin-2-yl)thio]acetic acid (III)

A stirred solution of 33 ml. of 0.945 N aqueous sodium hydroxide solution and 75 ml. of methanol is cooled in an ice bath and treated with 9.03 g., (0.03 mole) of 7-chloro-1,3-dihydro-3-methyl-5-phenyl-2H-1,4-benzodiazepine-2-thione (II). To this mixture is added an ice cold solution of 4.5 g. of bromoacetic acid in 35.7 ml. of 0.945 N aqueous sodium hydroxide solution; the mixture is kept at ambient temperature for about 2–3 hr. and concentrated in vacuo to remove methanol. The residual aqueous solution thus obtained is diluted with water, cooled in an ice bath and acidified to about pH 4 with cold, dilute aqueous hydrochloric acid. The solid thus obtained is collected by filtration, washed with water, dried and crystallized from methylene chlorideethanol to give 5.27 g. of [(7-chloro-3-methyl-5-phenyl-3H-1,4-benzodiazepin-2-yl)thio]acetic acid (III), m.p. 182°–183.5°C. dec.; additional product, 2.1 g., m.p. 165°–176°C. dec. is obtained by crystallizing the mother liquor. Analytical sample is obtained by recrystallizing some of the product twice from methylene chloride-ethanol to give [(7-chloro-3-methyl-5-phenyl-3H-1,4-benzodiazepin-2-yl)-thio]acetic acid (III), m.p. 182°–184°C. dec.

Anal. Calcd. for: C₁₈H₁₅ClN₂O₂S: C, 60.25; H, 4.21;
Cl, 9.88; N, 7.81;
S, 8.93.
Found: C, 60.07; H, 4.26;
Cl, 10.11; N, 8.28;
S, 8.75.

EXAMPLE 3

[(5-Phenyl-3H-1,4-benzodiazepin-2-yl)thio]acetic acid (III)

Following the procedure of Examples 1 and 2, above, 1,3-dihydro-5-phenyl-2H-1,4-benzodiazepine-2-thione (II) is reacted with bromoacetic acid under basic conditions in the presence of an alkali metal hydroxide or alkoxide to obtain [(5-phenyl-3H-1,4-benzodiazepin-2-yl)thio]acetic acid (III).

EXAMPLE 4

[(7-Chloro-5-(o-chlorophenyl)-3-H-1,4-benzodiazepin-2-yl)thio]acetic acid (III)

Following the procedure of Examples 1 and 2, above, 7-chloro-1,3-dihydro-5-(o-chlorophenyl)-2H-1,4-benzodiazepine-2-thione (II) is reacted with bromoacetic acid under basic conditions in the presence of an alkali metal hydroxide or alkoxide to obtain [(7-chloro-5-(o-chlorophenyl)-3H-1,4-benzodiazepin-2-yl)thio]acetic acid (III).

EXAMPLE 5

[(7-Chloro-5-(o-fluorophenyl)-3H-1,4-benzodiazepin-2-yl)thio]acetic acid (III)

Following the procedure of Examples 1 and 2, above, 7-chloro-1,3-dihydro-5-(p-fluorophenyl)-2H-1,4-benzodiazepine-2-thione (II) is reacted with bromoacetic acid under basic conditions in the presence of an alkali metal hydroxide or alkoxide to obtain [(7-chloro-5-(o-fluorophenyl)-3H-1,4-benzodiazepin-2-yl)thio]acetic acid (III).

EXAMPLE 6

[(7-Propyl-5-(m-nitrophenyl)-3H-1,4-benzodiazepin-2-yl)thio]acetic acid (III)

Following the procedure of Examples 1 and 2, above, 7-propyl-1,3-dihydro-5-(m-nitrophenyl)-2H-1,4-benzodiazepine-2-thione (II) is reacted with bromoacetic acid under basic conditions in the presence of an alkali metal hydroxide or alkoxide to obtain [(7-propyl-5-(m-nitrophenyl)-3H-1,4-benzodiazepin-2-yl)thio]acetic acid (III).

EXAMPLE 7

[(8-Isopropyl-5-(o-methylthiophenyl)-3H-1,4-benzodiazepin-2-yl)thio]acetic acid (III)

Following the procedure of Examples 1 and 2, above, 8-isopropyl-1,3-dihydro-5-(o-methylthiophenyl)-2H-1,4-benzodiazepine-2-thione (II) is reacted with bromoacetic acid under basic conditions in the presence of an alkali metal hydroxide or alkoxide to obtain [(8-isopropyl-5-(o-methylthiophenyl)-3H-1,4-benzodiazepin-2-yl)thio]acetic acid (III).

EXAMPLE 8

[(7-Methyl-5-(p-ethylphenyl)-3H-1,4-benzodiazepin-2-yl)thio]acetic acid (III)

Following the procedure of Examples 1 and 2, above, 7-methyl-1,3-dihydro-5-(p-ethylphenyl)-2H-1,4-benzodiazepine-2-thione (II) is reacted with bromoacetic acid under basic conditions in the presence of an alkali metal hydroxide or alkoxide to obtain [(7-methyl-5-(p-ethylphenyl)-3H-1,4-benzodiazepin-2-yl)thio]acetic acid (III).

EXAMPLE 9

[(6-Ethyl-5-(m-trifluoromethylphenyl)-3H-1,4-benzodiazepin-2yl)thio]acetic acid (III)

Following the procedure of Examples 1 and 2, above, 6-ethyl-1,3-dihydro-5-(m-trifluoromethylphenyl)-2H-1,4-benzodiazepine-2-thione (II) is reacted with bromoacetic acid under basic conditions in the presence of an alkali metal hydroxide or alkoxide to obtain [(6-ethyl-5-(m-trifluoromethylphenyl)-3H-1,4-benzodiazepin-2-yl)thio]acetic acid (III).

EXAMPLE 10

[(3,7-Dimethyl-5-(p-chlorophenyl)-3H-1,4-benzodiazepin-2-yl)thio]acetic acid (II)

Following the procedure of Examples 1 and 2, above, 3,7-dimethyl-1,3-dihydro-5-(p-chlorophenyl)-2H-1,4-benzodiazepine-2-thione (II) is reacted with bromoacetic acid under basic conditions in the presence of an alkali metal hydroxide or alkoxide to obtain [(3,7-dimethyl-5-(p-chlorophenyl)-3H-1,4-benzodiazepin-2-yl)thio]acetic acid (III).

In the same manner following the procedures of Examples 1 and 2, above, other [(5-phenyl-3H-1,4-benzodiazepin-2-yl)-thio]acetic acids of formula III are produced by reacting a 1,3-dihydro-5-phenyl-2H-1,4-benzodiazepine-2-thione (II) with bromoacetic acid under basic conditions. Representative compounds thus produced comprise:

[(7-bromo-5-phenyl-3H-1,4-benzodiazepin-2-yl)thio]acetic acid,
[(7-nitro-5-(o-chlorophenyl)-3H-1,4-benzodiazepin-2-yl)-thio]acetic acid,
[(3-ethyl-8-trifluoromethyl-5-phenyl-3H-1,4-benzodiazepin-2-yl)thio]acetic acid,
[(3-isopropyl-8-nitro-5-(m-nitrophenyl)-3H-1,4-benzodiazepin-2-yl)thio]acetic acid,
[(3,7-dimethyl-5-(p-propylphenyl)-3H-1,4-benzodiazepin-2-yl)thio]acetic acid,
[(7-fluoro-5-(o-fluorophenyl)-3H-1,4-benzodiazepin-2-yl)thio]acetic acid, [(9-isopropyl-5-(m-bromophenyl)-3H-1,4-benzodiazepin-2-yl)thio]acetic acid,
[(7-ethylthio-3-propyl-5-phenyl-3H-1,4-benzodiazepin-2-yl)thio]acetic acid,
[(5-(o-chlorophenyl)-3H-1,4-benzodiazepin-2-yl)thio]-acetic acid, and the like.

EXAMPLE 11

8-Chloro-6-phenylthiazolo[3,2-a][1,4]benzodiazepin-1(2H)-one (Ia)

A mixture of 3.45 g. (0.01 mole) of [(7-chloro-5-phenyl3H-1,4-benzodiazepin-2-yl)thio]acetic acid (III) is added under nitrogen to a mixture of 5 ml. of acetic anhydride and 10 ml. of triethyl amine. The reaction mixture becomes warm and is then stirred at ambient temperature for about 1¼ hours, cooled in an ice bath and treated with 27 ml. of absolute ethanol. The resulting mixture is stored at 4°C. for about 18 hr. and concentrated in vacuo. The residue thus obtained is treated successively with xylene, toluene and benzene with concentration after each addition. The residue is then crystallized from ethyl acetate-ethanol to give: 2.12 g., m.p. 182°C. and 0.376 g., m.p. 179°–180°C. of 8-chloro-6-phenylthiazolo[3,2-a][1,4]benzodiazepin-1(2H)-one. An analytical sample of 8-chloro-6-phenylthiazolo-[3,2-a][1,4]benzodiazepon-1(2H)-one (Ia) recrystallized from ethyl acetate-ethanol melts at 182°–183°; UV (ethanol) end absorption, 248 $\mu$ (inflection, 12,900), $\lambda$ max. 281 ($\epsilon$=9450), 400 (3050); IR (Nujol) 1705 cm$^{-1}$ (C=O).

Anal. Calcd. for $C_{17}H_{11}ClN_2SO$: C, 62.47; H, 3.39; Cl, 10.85; N, 8.57; S, 9.81.
Found: C, 62.41; H, 3.39; Cl, 10.89; N, 8.49; S, 9.83.

EXAMPLE 12

8-Chloro-4-methyl-6-phenylthiazolo[3,2-a][1,4]-benzodiazepin-1(2H)-one (Ia)

[(7-Chloro-3-methyl-5-phenyl-3H-1,4-benzodiazepin-2-yl)thio]acetic acid (III) (1.08 g.) is added to a stirred mixture of 6 ml. of triethylamine and 3 ml. of acetic anhydride. The reaction mixture is then warmed to about 65°C. over a period of about 40 minutes and then kept at about 65°–72°C. to about 1 hour. The reaction mixture is then concentrated in vacuo and the residue thus obtained is crystallized from ethyl acetate-Skellysolve B hexanes to give 0.533 g., m.p. 135.5°–140°C. and 0.250 g., m.p. 133°–139.5°C. of 8-chloro-4-methyl-6-phenylthiazolo[3,2-a][1,4]benzodiazepin-1(2H)-one (Ia), an analytical sample of which is recrystallized from diethyl ether-petroleum ether melting at 136.5°–141.5°C.

Anal. Calcd. for $C_{18}H_{13}ClN_2OS$: C, 63.44; H, 3.84; Cl, 10.40; N, 8.22; S, 9.41.
Found: C, 63.14; H, 3.87; Cl, 10.60; N, 8.16; S, 9.08.

EXAMPLE 13

6-Phenylthiazolo[3,2-a][1,4]benzodiazepin-1(2H)one (Ia)

Following the procedure of Examples 11 and 12, above, [(5-phenyl-3H-1,4-benzodiazepin-2-yl)thio]acetic acid (III) is treated with a mixture of triethylamine and acetic anhydride to obtain 6-phenylthiazolo[3,2-a][1,4]benzodiazepin-1(2H)-one.

EXAMPLE 14

8-Chloro-6-(o-chlorophenyl)thiazolo[3,2-a][1,4]-benzodiazepin-1(2H)-one (Ia)

Following the procedure of Examples 11 and 12, above, [(7-chloro-5-(o-chlorophenyl)-3H-1,4-benzodiazepin-2-yl)-thio]acetic acid (III) is treated with a mixture of triethylamine and acetic anhydride to obtain 8-chloro-6-(o-chlorophenyl)thiazolo[3,2-a][1,4]benzodiazepin-1(2H)-one.

EXAMPLE 15

8-Chloro-6-(o-fluorophenyl)thiazolo[3,2-a][1,4]-benzodiazepin-1(2H)-one (Ia)

Following the procedure of Examples 11 and 12, above, [(7-chloro-3-(o-fluorophenyl)-3H-1,4-benzodiazepin-2-yl)-thio]acetic acid (III) is treated with a mixture of triethyl-amine and acetic anhydride to obtain 8-chloro-6-(o-fluorophenyl)thiazolo[3,2-a][1,4]benzodiazepin-1(2H)-one.

EXAMPLE 16

8-Propyl-6-(m-nitrophenyl)thiazolo[3,2-a][1,4]-benzodiazepin-1(2H)-one (Ia)

Following the procedure of Examples 11 and 12, above, [(7-propyl-5-(m-nitrophenyl)-3H-1,4-benzodiazepin-2-yl)thio]acetic acid (III) is treated with a mixture of triethylamine and acetic anhydride to obtain 8-propyl-6-(m-nitrophenyl)thiazolo[3,2-a][1,4]benzodiazepin-1(2H)-one.

EXAMPLE 17

9-Isopropyl-6-(o-methylthiophenyl)thiazolo-[3,2-a][1,4]benzodiazepin-1(2H)-one (Ia)

Following the procedure of Examples 11 and 12, above, [(8-isopropyl-5-(o-methylthiophenyl)-3H-1,4-benzodiazepin-2-yl)thio]acetic acid (III) is treated with a mixture of triethylamine and acetic anhydride to obtain 9-isopropyl-6-(o-methylthiophenyl)thiazolo[3,2-a][1,4]benzodiazepine-1-(2H)-one.

EXAMPLE 18

8-Methyl-6-(p-ethylphenyl)thiazolo[3,2-a][1,4]-benzodiazepin-1(2H)-one (Ia)

Following the procedure of Examples 11 and 12, above, [(7-methyl-5-(p-ethylphenyl)-3H-1,4-benzodiazepin-2-yl)thio]-acetic acid (III) is treated with a mixture of triethylamine and acetic anhydride to obtain 8-methyl-6-(p-ethylphenyl)-thiazolo[3,2-a][1,4]benzodiazepin-1(2H)-one.

EXAMPLE 19

7-Ethyl-6-(m-trifluoromethylphenyl)thiazolo-3,2-a][1,4]benzodiazepin-1(2H)-one (Ia)

Following the procedure of Examples 11 and 12, above, [(6-ethyl-5-(m-trifluoromethylphenyl)-3H-1,4-benzodiazepin-2-yl)thio]acetic acid (III) is treated with a mixture of triethylamine and acetic anhydride to obtain 7-ethyl-6-(m-trifluoromethylphenyl)thiazolo[3,2-a][1,4]benzodiazepin-1(2H)-one.

EXAMPLE 20

4,8-Dimethyl-6-(p-chlorophenyl)thiazolo[3,2-a]-[1,4]benzodiazepin-1(2H)-one (Ia)

Following the procedure of Examples 11 and 12, above, [(3,7-dimethyl-5-(p-chlorophenyl)-3H-1,4-benzodiazepin-2-yl)thio]acetic acid (III) is treated with a mixture of triethylamine and acetic anhydride to obtain 4,8-dimethyl-6-(p-chlorophenyl)thiazolo[3,2-a][1,4]benzodiazepin-1(2H)-one.

In the manner given in Examples 11–20, above, other [(5-phenyl-3H-1,4-benzodiazepin-2-yl)thio]acetic acids of formula III, for example those prepared and listed in Example 10, above, are subjected to ring closure by treatment with a mixture of triethylamine and acetic anhydride to obtain the corresponding 6-phenylthiazolo[3,2-a][1,4]benzodiazepin-1(2H)-ones of formula Ia, respectively, such as:

8-bromo-6-phenylthiazolo[3,2-a][1,4]benzodiazepin-1(2H)-one;

8-nitro-6-(o-chlorophenyl)thiazolo[3,2-a][1,4]benzodiazepin-1(2H)-one;

4-ethyl-9-trifluoromethyl-6-phenylthiazolo[3,2-a][1,4]-benzodiazepin-1(2H)-one;

4-isopropyl-9-nitro-5-(m-nitrophenyl)thiazolo[3,2-a]-[1,4]benzodiazepin-1(2H)-one;

4,8-dimethyl-6-(p-propylphenyl)thiazolo[3,2-a][1,4]-benzodiazepin-1(2H)-one;

8-fluoro-6-(o-fluorophenyl)thiazolo[3,2-a][1,4]benzodiazepin-1(2H)-one;

10-isopropyl-6-(m-bromophenyl)thiazolo[3,2-a][1,4]-benzodiazepin-1(2H)-one;

8-ethylthio-4-propyl-6-phenylthiazolo[3,2-a][1,4]-benzodiazepin-1(2H)-one, 6-(o-chlorophenyl)thiazolo[3,2-a][1,4]benzodiazepin-1(2H)-one; and the like.

EXAMPLE 21

8-Chloro-2-methyl-6-phenylthiazolo[3,2-a][1,4]-benzodiazepin-1(2H)-one (Ic) and 8-chloro-2,2-dimethyl-6-phenylthiazolo[3,2-a][1,4]benzodiazepin-1(2H)-one (Ib)

A solution of 0.77 ml. (0.0055 mole) of diisopropylamine in 10 ml. of tetrahydrofuran is cooled in a Dry Ice-acetone bath and treated, under nitrogen, with 3.44 ml., (0.0055 mole) of n-butyllithium in hexane. To this solution is added 1.814 g. (0.005 mole) of 8-chloro-6-phenylthiazolo[3,2-a][1,4]benzodiazepin-1(2H)-one (Ia) in 25 ml. of tetrahydrofuran over a period of about 4 minutes. The resulting solution is then treated with 0.342 ml. of methyl iodide and the mixture is kept in the Dry Ice-acetone for about 4½ hours during which time no alkylation occurred. The mixture is then transferred to an ice-salt bath for about 1¾ hours, poured into ice water and extracted with chloroform. The extract is washed with brine, dried over sodium sulfate and concentrated. The residue thus obtained is chromatographed on 100 g. of silica gel with 10% ethyl acetate-90% cyclohexane. The first product is eluted from the column as 0.274 g. of an oil which is recrystallized from methylene chloride-diethyl ether-petroleum ether to give 8-chloro-2,2-dimethyl-6-phenylthiazolo[3,2-a][1,4]benzodiazepin-1(2H)-one (Ib) an analytical sample of which recrystallized from the same solvent mixture melts at 193.5°–195.5°C.

Anal. Calcd. for $C_{19}H_{15}ClN_2OS$: C, 64.31; H, 4.26; Cl, 9.99; N, 7.89; S, 9.03.
Found: C, 64.40; H, 4.33; Cl, 10.26; N, 7.82; S, 9.00.

The second compound is eluted from the column as 0.400 g. of an oil which is crystallized from ethyl acetate-methanol to give 8-chloro-2-methyl-6-phenylthiazolo[3,2-a]-[1,4]benzodiazepin-1(2H)-one (Ic), an analytical sample of which recrystallized from the same solvent mixture melts at 107°–110°C.

Anal. Calcd. for $C_{18}H_{13}ClN_2OS$: C, 63.44; H, 3.84; Cl, 10.40; N, 8.22; S, 9.41.
Found: C, 63.44; H, 4.12; Cl, 10.23; N, 8.38; S, 9.43.

EXAMPLE 22

8-Chloro-2,2,4-trimethyl-6-phenylthiazolo[3,2-a]-[1,4]benzodiazepin-1(2H)-one (Ib) and 8-chloro-2,4-dimethyl-6-phenylthiazolo[3,2-a][1,4]benzodiazepin-1(2H)-one (Ic).

Following the procedure of Example 21, above, 8-chloro-4-methyl-6-phenylthiazolo[3,2-a][1,4]benzodiazepin-1(2H)-one (Ia) is alkylated with methyl iodide to obtain 8-chloro-2,2,4-trimethyl-6-phenylthiazolo[3,2-a][1,4]benzodiazepin-1(2H)-one (Ib) and 8-chloro-2,4-dimethyl-6-phenylthiazolo-[3,2-a][1,4]benzodiazepin-1(2H)-one (Ic).

EXAMPLE 23

2,2-Diethyl-6-phenylthiazolo[3,2-a][1,4]benzodiazepin-1(2H)-one (Ib) and 2-ethyl-6-phenyl-thiazolo[3,2-a][1,4]benzodiazepin-1(2H)one (Ic)

Following the procedure of Example 21, above, 6-phenyl-thiazolo[3,2-a][1,4]benzodiazepin-1(2H)-one (Ia) is alkyl-ated with ethyl iodide to obtain 2,2-diethyl-6-phenylthiazolo[3,2-a][1,4]benzodiazepin-1(2H)-one (Ib) and 2-ethyl-6-phenylthiazolo[3,2-a][1,4]benzodiazepin-1(2H)-one (Ic).

EXAMPLE 24

8-Chloro-2,2-dipropyl-6-(o-chlorophenyl)thiazolo-[3,2-a][1,4]benzodiazepin-1(2H)-one (Ib) and 8-chloro-2-propyl-6-(o-chlorophenyl)thiazolo[3,2-a]-[1,4]benzodiazepin-1(2H)-one (Ic)

Following the procedure of Example 21, above, 8-chloro-6-(o-chlorophenyl)thiazolo[3,2-a][1,4]benzodiazepin-1(2H)-one (Ia) is alkylated with propyl bromide to obtain 8-chloro-2,2-dipropyl-6-(o-chlorophenyl)thiazolo[3,2-a][1,4]benzodiazepin-1(2H)-one (Ib) and 8-chloro-2-propyl-6-(o-chlorophenyl)thiazolo[3,2-a][1,4]benzodiazepin-1(2H)-one (Ic).

EXAMPLE 25

8-Chloro-2,2-diisopropyl-6-(o-fluorophenyl)-thiazolo[3,2-a][1,4]benzodiazepin-1(2H)-one (Ib) and 8-chloro-2-isopropyl-6-(o-fluorophenyl)-thiazolo[3,2-a][1,4]benzodiazepin-1(2H)-one (Ic)

Following the procedure of Example 21, above, 8-chloro-6-(o-fluorophenyl)thiazolo[3,2-a][1,4]benzodiazepin-1(2H)-one (Ia) is alkylated with isopropyl chloride to obtain 8-chloro-2,2-diisopropyl-6-(o-fluorophenyl)thiazolo[3,2-a]-[1,4]benzodiazepin-1(2H)-one (Ib) and 8-chloro-2-isopropyl-6-(o-fluorophenyl)thiazolo[3,2-a][1,4]benzodiazepin-1(2H)-one (Ic).

EXAMPLE 26

8-Propyl-2,2-dimethyl-6-(m-nitrophenyl)thiazolo-[3,2-a][1,4]benzodiazepin-1(2H)-one (Ib) and 8-propyl-2-methyl-6-(m-nitrophenyl)thiazolo[3,2-a]-[1,4]benzodiazepin-1(2H)-one (Ic)

Following the procedure of Example 21, above, 8-propyl-6-(m-nitrophenyl)thiazolo[3,2-a][1,4]benzodiazepin-1(2H)-one (Ia) alkylated with methyl bromide to obtain 8-propyl-2,2-dimethyl-6-(m-nitrophenyl)thiazolo[3,2-a][1,4]benzodiazepin-1(2H)-one (Ib) and 8-propyl-2-methyl-6-(m-nitrophenyl)-thiazolo[3,2-a][1,4]benzodiazepin-1(2H)-one (Ic).

EXAMPLE 27

9-Isopropyl-2,2-diethyl-6-(o-methylphenyl)-thiazolo[3,2-a][1,4]benzodiazepin-1(2H)-one (Ib) and 9-isopropyl-2-ethyl-6-(o-methylphenyl)-thiazolo[3,2-a][1,4]benzodiazepin-1(2H)-one (Ic)

Following the procedure of Example 21, above, 9-isopropyl-6-(o-methylphenyl)thiazolo[3,2-a][1,4]benzodiazepin-1(2H)-one (Ia) is alkylated with ethyl chloride to obtain 9-isopropyl-2,2-diethyl-6-(o-methylphenyl)thiazolo[3,2-a]-[1,4]benzodiazepin-1(2H)-one (Ib) and 9-isopropyl-2-ethyl-6-(o-methylphenyl)thiazolo[3,2-a][1,4]benzodiazepin-1(2H)-one (Ic).

EXAMPLE 28

8-Methyl-2,2-dipropyl-6-(p-ethylphenyl)thiazolo-[3,2-a][1,4]benzodiazepin-1(2H)-one (Ib) and 8-methyl-2-propyl-6-(p-ethylphenyl)thiazolo[3,2-a]-[1,4]benzodiazepin-1(2H)-one (Ic)

Following the procedure of Example 21, above, 8-methyl-6-(p-ethylphenyl)thiazolo[3,2-a][1,4]benzodiazepin-1(2H)-one (Ia) is alkylated with propyl iodide to obtain 8-methyl-2,2-dipropyl-6-(p-ethylphenyl)thiazolo[3,2-a][1,4]benzodiazepin-1(2H)-one (Ib) and 8-methyl-2-propyl-6-(p-ethylphenyl)-thiazolo[3,2-a][1,4]benzodiazepin-1(2H)-one (Ic).

EXAMPLE 29

7-Ethyl-2,2-diisopropyl-6-(m-trifluoromethylphenyl)thiazolo[3,2-a][1,4]benzodiazepin-1(2H)-one (Ib) and 7-ethyl-2-isopropyl-6-(m-trifluoromethylphenyl)thiazolo[3,2-a][1,4]benzodiazepin-1(2H)-one (Ic)

Following the procedure of Example 21, above, 7-ethyl-6-(m-trifluoromethylphenyl)thiazolo[3,2-a][1,4]benzodiazepin-1(2H)-one (Ia) is alkylated with isopropyl bromide to obtain 7-ethyl-2,2-diisopropyl-6-(m-trifluoromethylphenyl)thiazolo-[3,2-a][1,4]benzodiazepin-1(2H)-one (Ib) and 7-ethyl-2-isopropyl-6-(m-trifluoromethylphenyl)thiazolo[3,2-a][1,4]-benzodiazepin-1(2H)-one (Ic).

EXAMPLE 30

2,2,4,8-Tetramethyl-6-(p-chlorophenyl)thiazolo-[3,2-a][1,4]benzodiazepin-1(2H)-one (Ib) and 2,4,8-trimethyl-6-(p-chlorophenyl)thiazolo[3,2-a]-[1,4]benzodiazepin-1(2H)-one (Ic)

Following the procedure of Example 21, above, 4,8-dimethyl-6-(p-chlorophenyl)thiazolo[3,2-a][1,4]benzodiazepin-1(2H)-one (Ia) is alkylated with methyl chloride to obtain 2,2,4,8-tetramethyl-6-(p-chlorophenyl)thiazolo[3,2-a][1,4]-benzodiazepin-1(2H)-one (Ib) and 2,4,8-trimethyl-6-(p-chlorophenyl)thiazolo[3,2-a][1,4]benzodiazepin-1(2H)-one (Ic).

In the manner given in Examples 21–30, above, other 6-phenylthiazolo[3,2-a][1,4]benzodiazepin-1(2H)-ones of formula Ia, for example those prepared and listed in Example 20, above, are alkylated with the appropriate alkyl halide to obtain the corresponding 2,2-dialkyl-6-phenylthiazolo-[3,2][1,4]benzodiazepin-1(2H)-ones and 2-alkyl-6-phenylthiazolo[3,2][1,4-]benzodiazepin-1(2H)-ones of formulas Ib and Ic, respectively.

EXAMPLE 31

8-Chloro-2,2-dimethyl-6-phenylthiazolo[3,2-a]-[1,4]benzodiazepin-1(2H)-one (Id)

A solution of 0.77 ml. (0.0055 mole) of diisopropylamine in 10 ml. of tetrahydrofuran is cooled in a dry ice-acetone bath and treated, under nitrogen, with 3.44 ml., (0.0055 mole) of n-butyllithium in hexane. To this solution is added 1.884 g. (0.005 mole) of 8-chloro-2-methyl-6-phenyl-thiazolo[3,2-a][1,4]benzodiazepin-1(2H)-one (Ic) in 25 ml. of tetrahydrofuran over a period of about 4 minutes. The resulting solution is then treated with 0.342 ml. of methyl iodide and the mixture is kept in the dry ice-acetone bath for about 4½ hours during which time no alkylation occurred. The mixture is then transferred to an ice-salt bath for about 1¾ hours, poured into ice water and extracted with chloroform. The extract is washed with brine, dried over sodium sulfate and concentrated. The residue thus obtained is recrystallized from methylene chloride-diethyl ether-petroleum ether to give 8-chloro-2,2-dimethyl-6-phenylthiazolo[3,2-a][1,4]benzodiazepin-1(2H)-one (Id) with a melting point of 193.5°–195.5°C.

EXAMPLE 32

8-Chloro-2-ethyl-2,4-dimethyl-6-phenylthiazolo-[3,2-a][1,4]benzodiazepin-1(2H)-one (Id)

Following the procedure of Example 31, above, 8-chloro-2,4-dimethyl-6-phenylthiazolo[3,2-a][1,4]benzodiazepin-1(2H)-one (Ic) is alkylated with ethyl iodide to obtain 8-chloro-2-ethyl-2,4-dimethyl-6-phenylthiazolo[3,2-a][1,4]-benzodiazepin-1(2H)-one (Id).

EXAMPLE 33

2-Ethyl-2-propyl-6-phenylthiazolo[3,2-a]-[1,4]benzodiazepin-1(2H)-one (Id)

Following the procedure of Example 31, above, 2-ethyl-6-phenylthiazolo[3,2-a][1,4]benzodiazepin-1(2H)-one (Ic) is alkylated with propyl iodide to obtain 2-ethyl-2-propyl-6-phenylthiazolo[3,2-a][1,4]benzodiazepin-1(2H)-one (Id).

EXAMPLE 34

8-Chloro-2-propyl-2-isopropyl-6-(o-chlorophenyl)-thiazolo[3,2-a][1,4]benzodiazepin-1(2H)-one (Id)

Following the procedure of Example 31, above, 8-chloro-2-propyl-6-(o-chlorophenyl)thiazolo[3,2-a][1,4]benzodiazepin-1(2H)-one (Ic) is alkylated with isopropyl bromide to obtain 8-chloro-2-propyl-2-isopropyl-6-(o-chlorophenyl)thiazolo-[3,2-a][1,4]benzodiazepin-1(2H)-one (Id).

EXAMPLE 35

8-Chloro-2-methyl-2-isopropyl-6-(o-fluorophenyl)-thiazolo[3,2-a][1,4]benzodiazepin-1(2H)-one (Id)

Following the procedure of Example 31, above, 8-chloro-2-isopropyl-6-(o-fluorophenyl)thiazolo[3,2-a][1,4]benzodiazepin-1(2H)-one (Ic) is alkylated with methyl chloride to obtain 8-chloro-2-methyl-2-isopropyl-6-(o-fluorophenyl)thiazolo[3,2-a][1,4]benzodiazepin-1(2H)-one (Id).

EXAMPLE 36

8-Propyl-2-ethyl-2-methyl-6-(m-nitrophenyl)thiazolo[3,2-a][1,4]benzodiazepin-1(2H)-one (Id)

Following the procedure of Example 31, above, 8-propyl-2-methyl-6-(m-nitrophenyl)thiazolo[3,2-a][1,4]benzodiazepin-1(2H)-one (Ic) is alkylated with ethyl bromide to obtain 8-propyl-2-ethyl-2-methyl-6-(m-nitrophenyl)thiazolo[3,2-a]-[1,4]benzodiazepin-1(2H)-one (Id).

EXAMPLE 37

9-Isopropyl-2-ethyl-2-propyl-6-(o-methylphenyl)-thiazolo[3,2-a][1,4]benzodiazepin-1(2H)-one (Id)

Following the procedure of Example 31, above, 9-isopropyl-2-ethyl-6-(o-methylphenyl)thiazolo[3,2-a][1,4]benzodiazepin-1(2H)-one (Ic) is alkylated with propyl chloride to obtain 9-isopropyl-2-ethyl-2-propyl-6-(o-methylphenyl)thiazolo[3,2-a]-[1,4]benzodiazepin-1(2H)-one (Id).

EXAMPLE 38

8-Methyl-2-isopropyl-2-propyl-6-(p-ethylphenyl)-thiazolo[3,2-a][1,4]benzodiazepin-1(2H)-one (Id)

Following the procedure of Example 31, above, 8-methyl-2-propyl-6-(p-ethylphenyl)thiazolo[3,2-a][1,4]benzodiazepin-1(2H)-one (Ic) is alkylated with isopropyl iodide to obtain 8-methyl-2-isopropyl-2-propyl-6-(p-ethylphenyl)thiazolo-[3,2-a][1,4]benzodiazepin-1(2H)-one (Id).

EXAMPLE 39

7-Ethyl-2-methyl-2-isopropyl-6-(m-trifluoromethylphenyl)thiazolo[3,2-a][1,4]benzodiazepin-1(2H)-one (Id)

Following the procedure of Example 31, above, 7-ethyl-2-isopropyl-6-(m-trifluoromethylphenyl)thiazolo[3,2-a][1,4]-benzodiazepin-1-(2H)-one (Ic) is alkylated with methyl bromide to obtain 7-ethyl-2-methyl-2-isopropyl-6-(m-trifluoromethylphenyl)thiazolo[3,2-a][1,4]benzodiazepin-1(2H)-one (Id).

EXAMPLE 40

2-Ethyl-2,4,8-trimethyl-6-(p-chlorophenyl)thiazolo[3,2-a][1,4]benzodiazepin-1(2H)-one (Id)

Following the procedure of Example 31, above, 2,4,-8-trimethyl-6-(p-chlorophenyl)thiazolo[3,2-a][1,4]benzodiazepin-1(2H)-one (Ic) is alkylated with ethyl chloride to obtain 2-ethyl-2,4,8-trimethyl-6-(p-chlorophenyl)thiazolo[3,2-a]-[1,4]benzodiazepin-1(2H)-one (Id).

In the manner given in Examples 31–40, above, other 2-alkyl-6-phenylthiazolo[3,2-a][1,4]benzodiazepin-1(2H)-ones of formula Ic are alkylated with the appropriate alkyl halide to obtain the corresponding 2,2-dialkyl-6-phenylthiazolo[3,2-a][1,4]benzodiazepin-1(2H)-ones of formula Id, respectively, such as:

2-methyl-2-propyl-6-(o-chlorophenyl)thiazolo[3,2-a][1,4]-benzodiazepin-1(2H)-one;

8-chloro-2-ethyl-2-methyl-6-(o-chlorophenyl)thiazolo[3,2-a][1,4]benzodiazepin-1(2H)-one;

2,2-dimethyl-6-(o-chlorophenyl)thiazolo[3,2-a][1,4]-benzodiazepin-1(2H)-one; and 8-chloro-2-ethyl-2-propyl-6-phenylthiazolo[3,2-a][1,4]-benzodiazepin-1(2H)-one.

I claim:

1. A 6-phenylthiazolo[3,2-a][1,4]benzodiazepin-1(2H)-one of the formula:

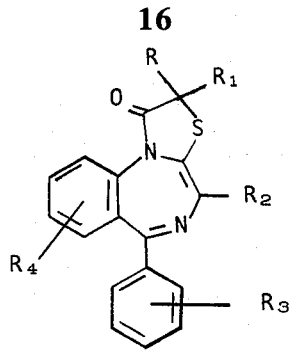

wherein R, $R_1$ and $R_2$ are each hydrogen or alkyl of 1 to 3 carbon atoms, inclusive, i.e., methyl, ethyl, propyl or isopropyl; and $R_3$ and $R_4$ are each hydrogen, alkyl, as defined above, halogen, nitro, trifluoromethyl or alkylthio in which alkyl has the meaning given, above, and the pharmacologically acceptable acid addition salts thereof.

2. 8-Chloro-6-phenylthiazolo[3,2-a][1,4]benzodiazepin-1(2H)-one, the compound of claim 1 wherein R, $R_1$, $R_2$ and $R_3$ are each hydrogen and $R_4$ is 8-chloro.

3. 8-Chloro-4-methyl-6-phenylthiazolo[3,2-a][1,4]benzodiazepin-1(2H)-one, a compound of claim 1 wherein R, $R_1$, and $R_3$ are each hydrogen, $R_2$ is methyl and $R_4$ is 8-chloro.

4. 8-Chloro-2-methyl-6-phenylthiazolo[3,2-a][1,4]benzodiazepin-1(2H)-one, the compound of claim 1 wherein $R_1$, $R_2$ and $R_3$ are each hydrogen, R is methyl and $R_4$ is 8-chloro.

5. 8-Chloro-2,2-dimethyl-6-phenylthiazolo[3,2-a][1,4]-benzodiazepin-1(2H)-one, the compound of claim 1 wherein $R_2$ and $R_3$ are each hydrogen, $R_1$ and $R_2$ are each methyl and $R_4$ is 8-chloro.

6. The process for the production of a 6-phenylthiazolo-[3,2-a][1,4]benzodiazepin-1(2H)-one of the formula:

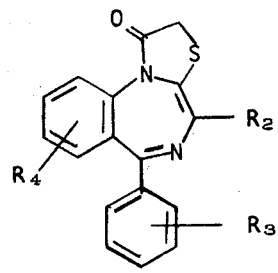

wherein $R_2$ is hydrogen or alkyl of 1 to 3 carbon atoms, inclusive, and $R_3$ and $R_4$ are each hydrogen, alkyl, as defined above, halogen, nitro, trifluoromethyl or alkylthio in which alkyl has the meaning given, above, which comprises: (1) reacting a 1,3-dihydro-5-phenyl-2H-1,4-benzodiazepine-2-thione of the formula:

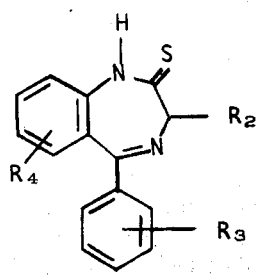

wherein R₂, R₃, and R₄ have the meanings given, above, with 2-bromoacetic acid under basic conditions to obtain a [(5-phenyl-3H-1,4-benzodiazepin-2-yl)thio]acetic acid of the formula:

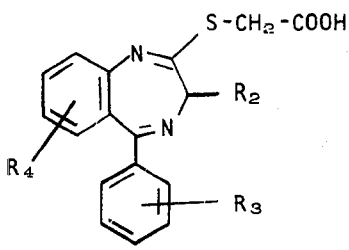

wherein R₂, R₃ and R₄ have the meanings given, above, and (2) treating the [(5-phenyl-3H-1,4-benzodiazepin-2-yl)thio]acetic acid thus obtained with acetic anhydride in the presence of triethylamine to obtain the corresponding 6-phenylthiazolo-[3,2-a][1,4]benzodiazepin-1(2H)-one.

7. The process of claim 6 wherein the starting material is 7-chloro-1,3-dihydro-5-phenyl-2H-1,4-benzodiazepine-2-thione and the product obtained is 8-chloro-6-phenylthiazolo[3,2-a]-[1,4]benzodiazepin-1(2H)-one.

8. The process of claim 6 wherein the starting material is 7-chloro-1,3-dihydro-3-methyl-5-phenyl-2H-1,4-benzodiazepine-2-thione and the product obtained is 8-chloro-4-methyl-6-phenylthiazolo[3,2-a][1,4]benzodiazepin-1(2H)-one.

9. The process for the production of 2-alkylated 6-phenylthiazolo[3,2-a][1,4]benzodiazepin-1(2H)-ones of the formulas:

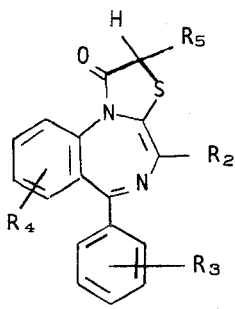

and

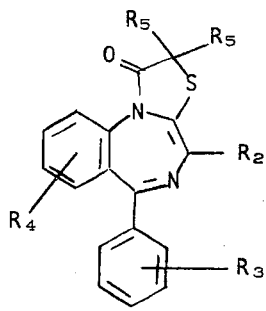

wherein R₂ is hydrogen or alkyl of 1 to 3 carbon atoms, inclusive, R₃ and R₄ are each hydrogen, alkyl, as defined above, halogen, nitro, trifluoromethyl or alkylthio in which alkyl has the meaning given, above, and R₅ is alkyl as defined above, which comprises: (1) reacting a 1,3-dihydro-5-phenyl-2H-1,4-benzodiazepin-2-thione of the formula:

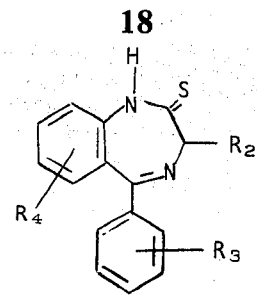

wherein R₂, R₃ and R₄ have the meanings given, above, with 2-bromoacetic acid under basic conditions to obtain a [(5-phenyl-3H-1,4-benzodiazepin-2-yl)thio]acetic acid of the formula:

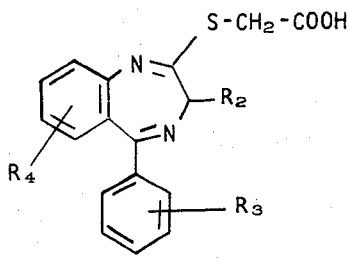

wherein R₂, R₃ and R₄ have the meanings given, above, (2) treating the [(5-phenyl-3H-1,4-benzodiazepin-2-yl)thio]-acetic acid thus obtained with acetic anhydride in the presence of triethylamine to obtain a 6-phenylthiazolo[3,2-a]-[1,4]benzodiazepin-1(2H)-one of the formula:

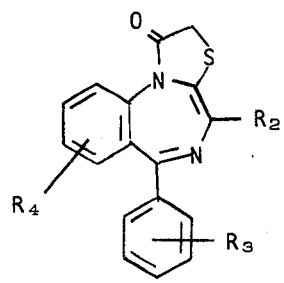

wherein R₂, R₃ and R₄ have the meanings given, above, and (3) alkylating the 6-phenylthiazolo[3,2-a][1,4]benzodiazepin-1(2H)-one thus obtained with an alkyl halide or an alkyl sulfate.

10. The process of claim 9 wherein the starting material is 7-chloro-1,3-dihydro-5-phenyl-2H-1,4-benzodiazepine-2-thione, the alkyl halide is a methyl halide and the products obtained are 8-chloro-2-methyl-6-phenylthiazolo[3,2-a][1,4]-benzodiazepin-1(2H)-one and 8-chloro-2,2-dimethyl-6-phenylthiazolo[3,2-a][1,4]benzodiazepin-1(2H)-one.

11. The process of claim 9, which includes the additional step of alkylating a 2-alkyl-6-phenylthiazolo[3,2-a][1,4]-benzodiazepin-1(2H)-one of the formula

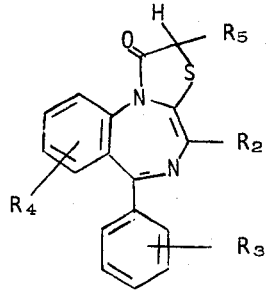

wherein $R_2$ is hydrogen or alkyl of 1 to 3 carbon atoms, inclusive, $R_3$ and $R_4$ are each hydrogen, alkyl, as defined above, halogen, nitro, trifluoromethyl or alkylthio in which alkyl has the meaning given, above, and $R_5$ is alkyl as defined above, with an alkyl halide or alkyl sulfate to obtain the corresponding 2,2-dialkyl-6-phenylthiazolo[3,2-a][1,4]benzodiazepin-1(2H)-one of the formula

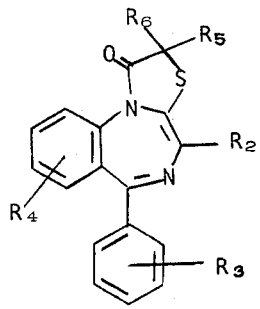

wherein $R_2$, $R_3$, $R_4$ and $R_5$ have meanings given above, and $R_6$ is alkyl as defined above.

* * * * *

UNITED STATES PATENT OFFICE
CERTIFICATE OF CORRECTION

Patent No. 3,897,446    Dated July 29, 1975

Inventor(s) Jackson B. Hester, Jr.

It is certified that error appears in the above-identified patent and that said Letters Patent are hereby corrected as shown below:

Column 6, line 30, "µ" should read --mµ--; line 59, "chlorideethanol" should read --chloride-ethanol--; Column 8, line 21, "acid (II)" should read --acid (III)--; line 60, "phenyl3H-" should read --phenyl 3H- --; Column 9, line 8, "248 µ" should read --248 mµ--; Column 10, line 43, "-3,2" should read -- [-3,2 --; Column 14, lines 6 and 7, "ic-eacetone" should read --ice-acetone--.

Signed and Sealed this

Third Day of April 1979

[SEAL]

Attest:

RUTH C. MASON
Attesting Officer

DONALD W. BANNER
Commissioner of Patents and Trademarks